April 25, 1933.   F. M. BOWERS   1,905,210
WELDER'S MASK
Filed Dec. 4, 1931
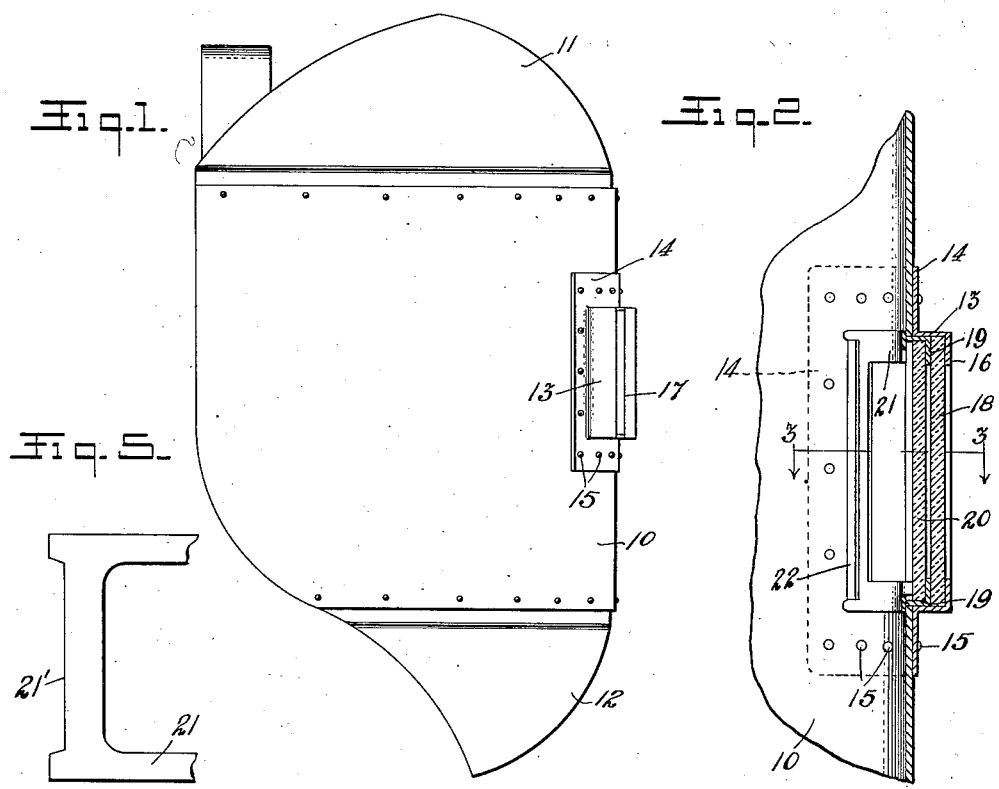
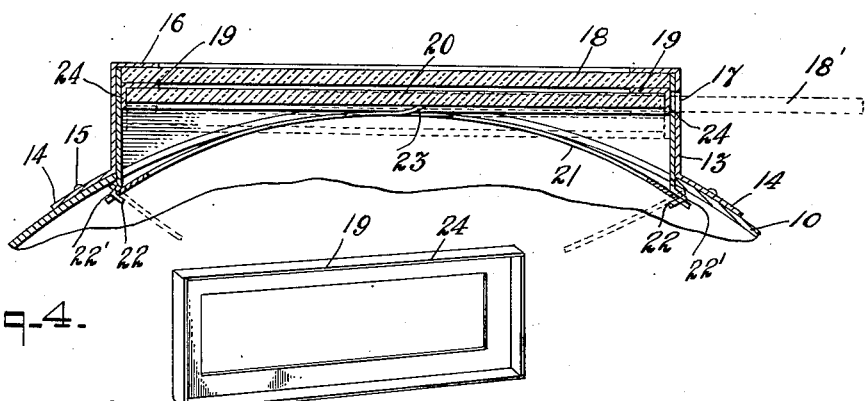
WITNESSES:
INVENTOR
Frederick M. Bowers
BY
Joshua R. H. Potts
HIS ATTORNEY Patented Apr. 25, 1933

1,905,210

UNITED STATES PATENT OFFICE

FREDERICK M. BOWERS, OF CHESTER, PENNSYLVANIA

WELDER'S MASK

Application filed December 4, 1931. Serial No. 578,894.

This invention relates to a welder's mask, and has for an object to provide a mask of flexible sheet material and improved means for maintaining the elements of the sight opening in proper relation.

A further object of the invention is to provide in combination with a mask, having an arcuate body of a housing fitted to the arcuate body, with improved means for inserting, maintaining and releasing the transparent or sub-transparent sheets in the housing to provide the requisite sight opening.

A further object of the invention is to provide in a mask the elements of a sight opening embodying two sheets of transparent or sub-transparent material spaced apart by other elements for providing an insulating spacing between such transparent sheets.

A further object of the invention is to provide in a welder's mask, a housing having an opening with a tray within the housing for containing one sheet of sub-transparent material and serving as a follower for another sheet of transparent material.

The invention therefore comprises an arcuate body with a housing arced over and about the body, but upon the anterior presenting a substantially plane part having a slot through one end for the insertion and withdrawal of a transparent sheet, with a tray within the housing bearing on said transparent sheet and carrying a sub-transparent sheet, and spring means for holding the two transparent sheets and the tray in yielding relation to the housing.

The invention is directed to other objects and possesses other features of novelty and advantage, some of which, together with the foregoing, will be hereinafter more fully set forth.

In the drawing:

Figure 1 is a view of a conventional welder's mask in side elevation, showing the present invention mounted thereon, Figure 2 is a vertical sectional view through the sight opening elements, taken substantially intermediate its ends, Figure 3 is a longitudinal sectional view, as indicated by line 3—3 of Figure 2, Figure 4 is a perspective view of the tray, and Figure 5 is a view in elevation of a fragment of the spring.

Like characters of reference indicate corresponding parts throughout the several views.

The improved welder's mask comprises a conventional arcuate body 10 with some form of upper and lower members, as indicated at 11 and 12 respectively. The exact form of these elements is not important to the present invention.

Upon the front of the body, an opening is provided, in the sheet material of which the body is composed, and a housing 13 is positioned over said opening and secured to the body by means of outstanding flanges 14, and any type of securing members illustrated by the rivets 15.

The housing at the anterior side corresponds substantially to a plane, and is cut out to produce flanges 16, the interior of which defines the sight opening. One of the sides of the housing 13 is provided with a slit 17 which extends transversely entirely across the housing, that is to say, in a normal vertical direction. Within the housing a transparent sheet 18 is positioned, bearing directly against the flanges 16, and a tray 19 formed as an open frame is positioned to bear upon said transparent sheet 18. The tray 19 has an unobstructed opening therethrough corresponding to and registering with the sight opening and contains a sub-transparent sheet 20, said sheet 20 being spaced away from the sheet 19 by the thickness of the material of the tray, as indicated at Figures 2 and 3, thus providing a trapped air space between the said sheets.

In the use of such welder's mask, considerable heat is developed which makes it desirable to provide an insulation between the glass plates. The two plates are employed, as is well known in the art, the plate 20 being a colored plate of relatively expensive glass, while the outer plate is of clear glass, relatively inexpensive.

The outer plate of glass is subjected to sparks flying from the work and becomes pitted, and in a short time, useless. It is desirable at such times to remove this sheet of glass 18 which is employed to protect the sub-transparent glass 20 and to replace it by a new sheet of glass. For this purpose, a spring 21 is employed, bearing upon the sheet 20, and by the pressure upon the tray 19, holding all of said members yieldingly against the flanges 16.

The spring 21 is in all respects similar to springs heretofore disclosed in applicant's patents, and is not novel to the present case. It comprises, however, a rectangular frame, the ends of which are formed with cut-out parts 21', which bear against the abutments 22 which are formed with angular shoulders 22' in which the cut-outs 21' fit. The center of the spring is provided with a spring finger 23, and the spring is bodily removed by flexing to the opposite curvature as shown in dotted lines, whereupon, it may be thus removed from engagement of the abutments 22, but when in such dotted line position, the glass 20 may be moved from thereunder without removing the spring.

When it is desired to remove the sheet of glass 18, pressure is exerted upon the exterior thereof to press it down so that the end is in registry with the slot 17, whereupon, it may be pushed outwardly through the slot 17, as indicated in dotted lines at 18'. The pressure upon the glass plate 18 compresses the spring 21 through the tray 19, and the glass plate 20. When the sheet 18 has been removed, as indicated at 18', a new sheet of glass is inserted in reverse direction, and when in position, by releasing the pressure thereon, the spring 21 forces the parts to the position shown at Figures 2 and 3. In this position, the flanges 24 of the tray cover the slot 17 to exclude light rays from entry therethrough.

This provides a novel, quick and convenient way of removing the glass plate 18 and replacing the same so that little occasion will arise for the operator to use the outer plate beyond the line of safety, or to prevent good workmanship.

Of course, the welder's mask, herein illustrated, may be modified in various ways without departing from the invention herein set forth and hereinafter claimed.

The invention is hereby claimed as follows:

1. A welder's mask comprising an arcuate body, a housing fitted to the arcuate body and provided at one end with a slot, a sheet of transparent material within the housing, a tray within the housing bearing upon said transparent sheet and covering the slot, a second sub-transparent sheet within the tray, and spring pressed means for maintaining the said sheets and tray in position.

2. A welder's mask comprising an arcuate body, a housing fitted to such arcuate body and provided with a sight opening having marginal inturned flanges and with a slot in one end of said housing, a sheet of transparent material inserted through said slot and bearing upon said flanges, a tray having marginal flanges entirely thereabout mounted within the housing and bearing upon the said sheet of transparent material and having an opening registering with the sight opening of the housing, a sheet of sub-transparent material within the tray, and resilient means for maintaining the sheets of material and the tray in operative yielding engagement with the flanges, and the flanges of the tray closing the slot.

3. A welder's mask comprising a body, a housing attached to the body and having a sight opening with inturned marginal flanges and with a slot in one of the walls of said housing, a transparent plate properly proportioned to be inserted through said slot bearing upon the flanges and completely covering the sight opening, a tray within the housing bearing upon the said transparent sheet and having a sight opening registering with the sight opening of the housing and a flange proportioned to cover the slot, a sub-transparent sheet within the tray spaced from the transparent sheet by the thickness of the material of the tray, and a resilient member for holding the two sheets and tray in operative yielding engagement with the flanges and with the flange of the tray covering the slot.

4. A welder's mask comprising a body having a housing attached thereto and conforming therewith, said housing having a sight opening in its anterior surface providing inturned flanges, said housing being also provided with a slot in one of its walls, a tray mounted loosely within the housing and corresponding substantially to the interior area thereof and having a sight opening registering with the sight opening of the housing, a transparent and a sub-transparent sheet spaced upon opposite sides of and apart by said tray, and a spring member within the mask having a part inserted within the housing and bearing upon the sheets and tray.

5. In a welder's mask a lens organization comprising a housing having a slot in one of its walls and a sight opening providing inturned marginal flanges, a tray mounted loosely within the housing and corresponding substantially to the interior area thereof, said tray being provided with a sight opening entirely therethrough corresponding substantially to and registering with the sight opening of the housing, said tray also embodying flanges entirely thereabout properly proportioned to cover the slot, a lens structure within the tray, and a spring member partly inserted within the housing and adapted to coact with the tray to maintain the position of the lens structure.

6. In a welder's mask a housing with a sight opening in the anterior wall and a slot through one of its lateral walls, a tray within the housing having a sight opening corresponding to and registering with the sight opening of the housing, laterally offset flanges forming a part of said tray, one of said flanges being proportioned and positioned to cover and close the slot, and means at the posterior of said tray for holding the tray yieldingly against posterior movement.

7. In a welder's mask a housing with a sight opening in the anterior wall and a slot through one of its lateral walls, a sheet of transparent material covering the sight opening, said slot being spaced from the anterior wall a distance greater than the thickness of the transparent sheet, a tray within the housing having a sight opening registering with the sight opening of the housing, and laterally offset flanges forming part of said tray, one of said flanges being proportioned to cover and close the slot.

8. In a welder's mask a housing with a sight opening in the anterior wall and a slot through one of its lateral walls, a sheet of transparent material covering the sight opening, said slot being spaced from the anterior wall a distance greater than the thickness of the transparent sheet, a tray within the housing having a sight opening registering with the sight opening of the housing, laterally offset flanges forming part of said tray, one of said flanges being proportioned and positioned to cover and close the slot, and means to hold the tray yieldingly against the transparent sheet with the said flanges in said closing position.

In testimony whereof I have signed my name to this specification.

FREDERICK M. BOWERS.